Patented Oct. 16, 1934

1,977,048

UNITED STATES PATENT OFFICE 1,977,048

PROCESS FOR BREAKING PETROLEUM EMULSIONS

Melvin De Groote, St. Louis, Mo., and Claudius H. M. Roberts, San Marino, Calif., assignors to Tretolite Company, Webster Groves, Mo., a corporation of Missouri No Drawing. Application December 7, 1933, Serial No. 701,346

14 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil", and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedure.

The treating agent or demulsifying agent used in our process consists of a mixed ester of a polyhydric alcohol of the kind obtained when a polyhydric alcohol or derivative thereof is partially esterified by the replacement of one or more of the alcoholiform hydroxyls by one or more monobasic, detergent-forming, carboxy acid residues or derivatives thereof, and when, in addition thereto, one or more of the alcoholiform hydroxyls is also replaced by an oxalic acid residue. Said treating agent or demulsifying agent represents one sub-division of the broad class of materials contemplated for use as the treating agent of the process described in pending application for patent of Claudius H. M. Roberts, Serial No. 665,962, filed April 13, 1933, and is also a specific type of the more narrow class of materials contemplated for use as the treating agent of the process described in pending application for patent Serial No. 701,345, filed December 7, 1933, by Claudius H. M. Roberts, but it is specifically different and is not claimed per se in either of said pending applications.

Esters are obtained by reactions between alcohols, such as monohydric or polyhydric alcohols, and acids including monobasic or polybasic carboxy acids. One mole of a polyhydric alcohol may be combined with two moles of a monocarboxy acid. One might employ one mole each of two different carboxy acids. In cases where such carboxy acids are different but combined with the same polyhydric alcohol, one may refer to the resulting ester as a mixed ester. The treating agent contemplated by my process consists of a mixed ester in which one of the organic acids combined with the polyhydric alcohol or residue is derived from non-hydroxylated, detergent-forming, monocarboxy acids. It is well known that non-hydroxylated fatty acids such as oleic acid, stearic acid, palmitic acid, linoleic acid, etc. combine with alkalis such as caustic soda or caustic potash to form soaps or detergents. It is also known that non-hydroxylated, monocarboxy, rosin acids, such as abietic acid, combine with alkalis to produce detergent material. Naphthenic acids derived from petroleum are generally non-hydroxylated, monocarboxylic, and they combine with alkalis to produce soap-like materials or detergents. The expression "non-hydroxylated" detergent-forming, monocarboxy acids refers to the type of materials above indicated. The polyhydric alcohol employed to produce the treating agent used in my process must not only be combined with at least one molecule of a non-hydroxylated, detergent-forming acid, but it must also be combined with at least one molecule of oxalic acid.

One may denote a polyhydric alcohol by the formula $$R'(OH)_n,$$

in which $n$ represents the numeral two or more. Oxalic acid is denoted by the formula $$(COOH)_2.$$

The non-hydroxylated, monocarboxy, detergent-forming acids herein contemplated may be represented by the formula $$D'COOH,$$

in which $D'$ represents the characteristic hydrocarbon chain and COOH is the conventional carboxyl group.

If a trihydric alcohol such as glycerol is combined with oxalic acid and also with the monocarboxy, detergent-forming acid such as oleic acid, so that complete esterification results, then the finished product may be expressed by the formula D.A.R., in which R is the polyhydric alcohol residue, A is the oxalic acid residue, and D is the detergent-forming acid residue. D.A.R. represents a mixed ester of the kind contemplated for use as the treating agent of our process. If glycerol is replaced by a dihydric alcohol, such as ethylene glycol, and if the glycol is first combined with oleic acid and then combined with oxalic acid, it is obvious that a mixed acid ester must result, insofar that the mixed ester contains an uncombined carboxyl radical. Such a type of mixed ester may be designated by the formula $$D.A.(COOH)_t R,$$

in which formula the symbols have their previous significance and $t$ represents the numeral one or more. If glycerol is replaced by diglycerol, which is essentially an ether alcohol having four carboxyls, and if a mole of oleic acid and a mole of oxalic acid be combined therewith, the mixed ester thus resulting would contain a free hydroxyl, and material of this type may be represented by the following formula:

$$D.A.R.(OH)_t.$$

Similarly, incomplete esterification, such as reaction between oleic acid and one hydroxyl radical of glycerol and also between one carboxyl of oxalic acid and one of the remaining hydroxyls of the same glycerol, will result in an amphoteric mixed ester of the type represented by the formula $$D.A.(COOH)_t R.(OH)_t.$$

Thus, the reagents employed in our process may be neutral esters, or they may be acid esters, or they may be basic esters, or they may be amphoteric esters. Briefly then, in the broadest sense the reagent or treating agent contemplated by our present process may be indicated by the formula $$D.A.(COOH)_m R.(OH)_m,$$

in which $m$ represents the numeral zero, one or more. The residual hydroxyl may be esterified with any acid, such as acetic, benzoic, etc.

As previously indicated, D.COOH is a non-hydroxylated, monocarboxy, detergent-forming acid, such as oleic acid, stearic acid, palmitic acid, abietic acid, naphthenic acid, etc. It is understood that simple derivatives of these acids, such as the chlorine derivatives, may be used instead of the acids themselves. The polyhydric alcohols employed may be aliphatic, aromatic, cyclic, aralkyl, heterocyclic, etc. Suitable polyhydric alcohols include ethylene glycol, glycerol, erythritol, adonitol, mannitol, dihydroxy-naphthalene, alizarin, purpurin, terpin, dihydroxy-thiophene, etc. Simple derivatives of the alcohols, such as chloro-glycerol, ether-alcohols, poly-glycols, poly-glycerols, etc. may be as effective as the unaltered polyhydric alcohol. The aliphatic, polybasic, carboxy acid employed is always oxalic acid, Oxalic acid, with or without water of crystallization, may be employed.

The manufacture of mixed esters is relatively simple. Generally speaking, the reagents are heated together under conditions which tend to remove the water formed as a result of esterification. In some instances the reagents are heated at a temperature higher than the boiling point of water. Sometimes esterification is carried on at a temperature lower than the boiling point of water, and a dried inert gas is passed through the mixed mass to eliminate any water which may be formed. Sometimes a catalyst, such as a trace of mineral acid, is added. These processes are well known and have been employed in the production of synthetic fats, neutral gums, plasticizers, synthetic rosins, perfume materials, flavoring materials, etc.

It is also well known that complex organic molecules of the kind constituting the type of reagent contemplated herein for use in our process, exhibit a marked tendency to polymerize, condense or resinify. Such complex polymerized, condensed or resinified products are just as suitable for use as the demulsifying agent in our process as the simpler unpolymerized, uncondensed or non-resinous products and the claims attached to this specification are intended to include all types without differentiation.

If the reaction results in the formation of an amphoteric or acid mixed ester, then obviously the acidic hydrogen can be replaced by any equivalent. Such acidic material may be treated with a suitable alkaline material such as caustic soda, caustic potash, ammonium hydroxide, calcium hydroxide, magnesium hydroxide, etc., so as to produce the corresponding metallic salts, many of which are water-soluble. The ammonium radical is considered as a metal. Basic amines, such as triethanolamine, may be employed for neutralization. The acidic hydrogen may be combined with an alcohol of any kind, as previously stated, to produce an ester. The acidic hydrogen may remain unneutralized. The hydroxyl of the carboxyl may be combined with an amine by eliminating a hydrogen of the amine with the separation of a molecule of water. Pyridine may be utilized to replace a conventional amine. Water-soluble salts of the kind previously referred to may be reacted with metallic water-soluble salts, such as copper salts, iron salts, aluminum salts, zinc salts, magnesium salts, etc. to produce salts of the respective metals by metathesis.

The previously described types of materials indicated by the formulas:

$$D.A.(COOH)_t R; \quad D.A.(COOH)_t R.(OH)_t$$

and $$D.A.(COOH)_m R.(OH)_m,$$

may be replaced by equivalent formulas, i. e., $$D.A.(COO.Z)_t R; \quad D.A.(COO.Z)_t R.(OH)_t$$

and $$D.A.(COO.Z)_m R.(OH)_m.$$

In these last mentioned types of formulas the hydrogen of the carboxyl H is replaced by Z, which indicates an acid hydrogen equivalent of the kind described, or may mean the acid hydrogen itself, in the case of an unneutralized acid. For the sake of brevity Z will simply be referred to as the acid hydrogen equivalent.

Our preferred treating agent or demulsifying agent is produced by reacting oleic acid and glycerol, so as to obtain mono-olein. One mole of mono-olein (or 356 lbs.) is then reacted with one mole (or 126 lbs.) of pulverized oxalic acid having water of crystallization at approximately 85 to 95° C. with constant stirring and with the passage of dried air until esterification takes place between one hydroxyl of the mono-olein and one carboxyl of the oxalic acid. The completeness of reaction can be recognized by titration of the residual free acidic hydrogen, due to the uncombined oxalic acid. Said material may be designated by the formula $$D.COO.COOH.R.OH,$$

in which D is an oleic acid residue, COO is the conventional carboxyl residue, R is a glycerol residue, COOH is the conventional carboxyl radical and OH is the conventional hydroxyl radical.

The materials previously described need not be employed alone, as a demulsifying agent, but may be employed in conjunction with other suitable demulsifiers, such as water softeners, modified fatty acids, oil-soluble or water-soluble petroleum sulfonic acids, substituted aromatic sulfonic acids, dialkyl sulfo acids, substituted amine acidic bodies, etc., or the salts and esters of the same or the like. One may add any suitable inert solvent or solvents to the reagent contemplated, particularly solvents which would lower the viscosity of the product and make it more adaptable for use, such as kerosene, solvent naphtha, cresol, pine oil, ethyl alcohol, butyl alcohol, propyl alcohol, etc.

In practicing our process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges, or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 10,000 parts of emulsion will usually be found to produce commercially satisfactory results.

Having thus described our invention, what we claim as new and desire to secure by Letters Patent is:

1. A process for breaking a petroleum emulsion of the water-in-oil type, which consists in subjecting the emulsion to the action of a mixed ester of the type $D.A.(COO.Z)_d R.(OH)_m$, in which D is a non-hydroxylated, detergent-forming, mono-carboxy acid residue, A is an oxalic acid residue, R is a polyhydric alcohol residue, COO is the conventional carboxyl residue, Z is the acidic hydrogen equivalent, OH is the conventional hydroxyl radical, $m$ represents the numeral zero, one or more, and $d$ represents the numeral zero or one.

2. A process for breaking a petroleum emulsion of the water-in-oil type, which consists in subjecting the emulsion to the action of a mixed ester of the type $D.A.(COO.Z)R.(OH)_m$, in which D is a non-hydroxylated, monocarboxy, detergent-forming acid residue, A is an oxalic acid residue, COO is the conventional carboxyl residue, R is a polyhydric alcohol residue, OH is the conventional hydroxyl radical, Z is a metallic atom, and $m$ represents the numeral zero, one or more.

3. A process for breaking a petroleum emulsion of the water-in-oil type, which consists in subjecting the emulsion to the action of a mixed ester of the type $D.A.(COO.Z)R.(OH)_m$, in which D is a non-hydroxylated, monocarboxy, detergent-forming acid residue, A is an oxalic acid residue, COO is the conventional carboxyl residue, R is a polyhydric alcohol residue, OH is the conventional hydroxyl radical, Z is a monohydric alcohol radical, and $m$ represents the numeral zero, one or more.

4. A process for breaking a petroleum emulsion of the water-in-oil type, which consists in subjecting the emulsion to the action of a mixed ester of the type $D.A.(COO.Z)R.(OH)_m$, in which D is a non-hydroxylated, monocarboxy, detergent-forming acid residue, A is an oxalic acid residue, COO is the conventional carboxyl residue, R is a polyhydric alcohol residue, OH is the conventional hydroxyl radical, Z is a basic amine residue, and $m$ represents the numeral zero, one or more.

5. A process for breaking a petroleum emulsion of the water-in-oil type, which consists in subjecting the emulsion to the action of a mixed acid ester of the type $D.A.(COOH)R$, in which D is a non-hydroxylated, detergent-forming, monocarboxy acid residue, A is an oxalic acid residue, COOH is the conventional carboxyl radical, and R is a polyhydric alcohol residue.

6. A process for breaking a petroleum emulsion of the water-in-oil type, which consists in subjecting the emulsion to the action of a mixed basic ester of the type $D.A.R.(OH)_t$, in which D is a non-hydroxylated, detergent-forming, monocarboxy acid residue, A is an oxalic acid residue, R is a polyhydric alcohol residue, OH is the conventional hydroxyl radical and $t$ represents the numeral one or more.

7. A process for breaking a petroleum emulsion of the water-in-oil type, which consists in subjecting the emulsion to the action of a mixed amphoteric ester of the type $D.A.(COOH)R(OH)_t$, in which D is a non-hydroxylated, detergent-forming, monocarboxy acid residue, A is an oxalic acid residue, COOH is the conventional carboxyl radical, R is a polyhydric alcohol residue, OH is the conventional hydroxyl radical and $t$ represents the numeral one or more.

8. A process for breaking a petroleum emulsion of the water-in-oil type, which consists in subjecting the emulsion to the action of a mixed ester of the type $D.A.(COOH)_d R.(OH)_m$, in which D is a non-hydroxylated, monocarboxy, fatty acid residue, A is an oxalic acid residue, COOH is the conventional carboxyl radical, R is a polyhydric alcohol residue, OH is the conventional hydroxyl radical, $m$ represents the numeral zero, one or more, and $d$ represents the numeral zero or one.

9. A process for breaking a petroleum emulsion of the water-in-oil type, which consists in subjecting the emulsion to the action of a mixed ester of the type $D.A.(COOH)_d R.(OH)_m$, in which D is a naphthenic acid residue, A is an oxalic acid residue, COOH is the conventional carboxyl radical, R is a polyhydric alcohol residue, OH is the conventional hydroxyl radical, $m$ represents the numeral zero, one or more, and $d$ represents the numeral zero or one.

10. A process for breaking a petroleum emulsion of the water-in-oil type, which consists in subjecting the emulsion to the action of a mixed ester of the type $D.A.(COOH)_d R.(OH)_m$, in which D is an abietic acid residue, A is an oxalic acid residue, COOH is the conventional carboxyl radical, R is a polyhydric alcohol residue, OH is the conventional hydroxyl radical, $m$ represents the numeral zero, one or more, and $d$ represents the numeral zero or one.

11. A process for breaking a petroleum emulsion of the water-in-oil type, which consists in subjecting the emulsion to the action of a mixed ester of the type $D.A.(COOH)_d R.(OH)_m$, in which D is an oleic acid residue, A is an oxalic acid residue, COOH is the conventional carboxyl radical, R is a polyhydric alcohol residue, OH is the conventional hydroxyl radical, $m$ represents the numeral zero, one or more, and $d$ represents the numeral zero or one.

12. A process for breaking a petroleum emulsion of the water-in-oil type, which consists in subjecting the emulsion to the action of a mixed ester of the type $D.A.(COOH)_d R.(OH)_m$, in which D is a non-hydroxylated, monocarboxy, fatty acid residue, A is an oxalic acid residue, COOH is the conventional carboxyl radical, R is a glycerol residue. OH is the conventional hydroxyl radical, $m$ represents the numeral zero, one or more, and $d$ represents the numeral zero or one.

13. A process for breaking a petroleum emulsion of the water-in-oil type, which consists in subjecting the emulsion to the action of a mixed ester of the type $D.A.(COOH)_d R.(OH)_m$, in which D is an oleic acid residue, A is an oxalic acid residue, COOH is the conventional carboxyl radical, R is a glycerol residue, OH is the conventional hydroxyl radical, $m$ represents the numeral zero, one or more, and $d$ represents the numeral zero or one.

14. A process for breaking a petroleum emulsion of the water-in-oil type, which consists in subjecting the emulsion to the action of a demulsifying agent obtained by reaction between a mole of mono-olein and one carboxyl of a mole of oxalic acid.

MELVIN DE GROOTE.
CLAUDIUS H. M. ROBERTS.